United States Patent
Noble, Jr. et al.

(10) Patent No.: US 10,212,200 B1
(45) Date of Patent: *Feb. 19, 2019

(54) HANDLING AUDIO PATH FAILURE AND POOR QUALITY OF SERVICE FOR VOICE CALLS IN A CONTACT CENTER

(71) Applicant: Noble Systems Corporation, Atlanta, GA (US)

(72) Inventors: James K. Noble, Jr., Marietta, GA (US); Chad Hitchcock, Johns Creek, GA (US); Marcin Pycko, Dallas, TX (US); Jason P. Ouimette, Berkeley Lake, GA (US); Christopher S. Haggerty, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,766

(22) Filed: Dec. 20, 2017

Related U.S. Application Data

(63) Continuation of application No. 15/212,767, filed on Jul. 18, 2016, now Pat. No. 9,882,944, which is a
(Continued)

(51) Int. Cl.
*H04M 1/24* (2006.01)
*H04M 3/08* (2006.01)
(Continued)

(52) U.S. Cl.
CPC ........ *H04L 65/1086* (2013.01); *H04L 43/087* (2013.01); *H04L 45/28* (2013.01);
(Continued)

(58) Field of Classification Search
CPC ............. H04L 2209/24; H04L 65/1006; H04L 65/104; H04L 65/105; H04L 65/1063;
(Continued)

(56) References Cited

U.S. PATENT DOCUMENTS

| | | | |
|---|---|---|---|
| 5,781,611 A | * | 7/1998 | Park ........................ H04Q 3/625 370/241 |
| 7,983,148 B1 | | 7/2011 | Abramson et al. |

(Continued)

*Primary Examiner* — Binh Kien Tieu

(57) ABSTRACT

Various embodiments of the invention provide methods, systems, and computer program products for handling an audio path failure and/or non-conformant QoS for a call between a contact center agent and remote party. Specifically, an audio path is established to a first telephony device being used by the agent and a call is bridged onto the audio path so that audio can be streamed back-and-forth between the first telephony device and a second telephony device being used by the party. Accordingly, various embodiments of the invention involve monitoring the audio path to detect an audio path failure and/or non-conformant QoS for the audio and bridging the call onto a second audio path when a failure or non-conformant QoS is detected so that the call is not disconnected from the second telephony device and a third device (e.g., IVR) can stream audio over the second audio path to the second telephony device.

15 Claims, 6 Drawing Sheets

Related U.S. Application Data continuation of application No. 15/086,245, filed on Mar. 31, 2016, now Pat. No. 9,456,076.

(51) Int. Cl.
*H04M 3/22* (2006.01)
*H04L 29/06* (2006.01)
*H04M 3/24* (2006.01)
*H04L 12/26* (2006.01)
*H04L 12/703* (2013.01)

(52) U.S. Cl.
CPC ...... *H04L 65/1006* (2013.01); *H04L 65/1069* (2013.01); *H04L 65/608* (2013.01); *H04L 65/80* (2013.01); *H04M 3/245* (2013.01); *H04M 2207/08* (2013.01)

(58) Field of Classification Search
CPC . H04L 9/0819; H04L 59/06027; H04L 65/80; H04L 67/14; H04L 69/40; H04L 41/5087; H04L 43/106; H04M 2203/2005; H04M 2203/2088; H04M 3/5232; H04M 3/28; H04M 3/50; H04M 7/0024; H04Q 3/0045

USPC ......... 379/1.01, 2, 9, 9.05, 14.01, 10.01, 12, 379/15.01, 16, 22, 22.03, 27.01, 29.01, 379/32.01, 32.02, 265.01, 265.02, 309; 370/242, 244, 248, 250, 251, 352, 353, 370/356, 357, 401

See application file for complete search history.

(56) References Cited

U.S. PATENT DOCUMENTS

| | | |
|---|---|---|
| 8,582,750 B2 | 11/2013 | Lee et al. |
| 9,294,615 B2 | 3/2016 | Lum et al. |
| 2006/0176805 A1 | 8/2006 | Peters |
| 2008/0222004 A1* | 9/2008 | Pollock ............. G06Q 30/0603 705/15 |
| 2011/0096673 A1 | 2/2011 | Stevenson et al. |
| 2011/0090788 A1 | 4/2011 | Hicks, III |
| 2015/0163361 A1 | 6/2015 | George |
| 2017/0214795 A1* | 7/2017 | Charlson ............. H04M 3/5175 |
| 2017/0272575 A1 | 9/2017 | Ouimette |

\* cited by examiner

HANDLING AUDIO PATH FAILURE AND POOR QUALITY OF SERVICE FOR VOICE CALLS IN A CONTACT CENTER

CROSS REFERENCE TO RELATED APPLICATIONS

This application is a continuation of U.S. patent application Ser. No. 15/212,767, filed on Jul. 18, 2016, which is a continuation of U.S. patent application Ser. No. 15/086,245, now U.S. Pat. No. 9,456,076 and filed on Mar. 31, 2016, in which the entire contents of both are incorporated by reference for all that they teach.

BACKGROUND

Although in today's World contact centers make use of a number of different channels of communication, voice calls still remain a popular channel for both inbound and outbound contact center traffic. However with that said, voice calls can encounter issues that affect the quality of a communication. For instance, delayed delivery of audio (e.g., audio data) for a voice call (known as latency) can lead to bad echo and the parties interrupting each other during the call. Generally speaking, one-way latency of greater than 150 milliseconds can negatively affect the quality of a call. While in other instances, variations in delay of audio delivery (known as jitter) can cause strange sound effects on the call. Further, audio loss caused by network congestion or loss of the network can cause interruptions in the call that are not typically recoverable. In fact, even one percent audio loss can significantly degrade a call. Thus, a need in the art exists for handling a call when call degradation occurs, especially in a business setting such as contact centers where loss of a call or poor call quality can negatively affect the success of the business. It is with respect to these considerations and others that the disclosure herein is presented.

BRIEF SUMMARY

In general, embodiments of the present invention provide computer program products, methods, systems, apparatus, and computing entities for handling an audio path failure or non-conformant (poor) quality of service (QoS) for a call being conducted between a contact center agent and a remote party. In particular embodiments, a first audio path is established to a first telephony device being used by the contact center agent and a call is bridged onto the first audio path. With respect to the call, audio is streamed from the first telephony device over the first audio path and is routed to a second telephony device being used by the remote party. In addition, audio is received at the first telephony device that originated from the second telephony device and was streamed over the first audio path.

At this point, various embodiments of the invention involve monitoring the first audio path to detect an audio path failure and/or non-conformant QoS for the audio streamed over the first audio path. Typically, an audio path failure involves a situation in which the audio from the first telephony device can no longer be streamed over the first audio path and/or the audio originated from the second telephony device can no longer be streamed over the first audio path to the first telephony device. While a non-conformant QoS typically involves a situation in which the audio being streamed over the first audio path from or to the first telephony device is at a level of quality considered to negatively affect the contact center agent and remote party conversing on the call.

Accordingly, upon detecting an audio path failure or non-conformant QoS, various embodiments of the invention involve bridging the call onto a second audio path so that the call is not disconnected from the second telephony device being used by the remote party and a third device can then stream audio over the second audio path that is routed to the second telephony device. Depending on the embodiment, this third device may be any one of a number of different devices such as, for example, an interactive voice response system (IVR), a voice mail system, or a telephony device being used by a second contact center agent.

The subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
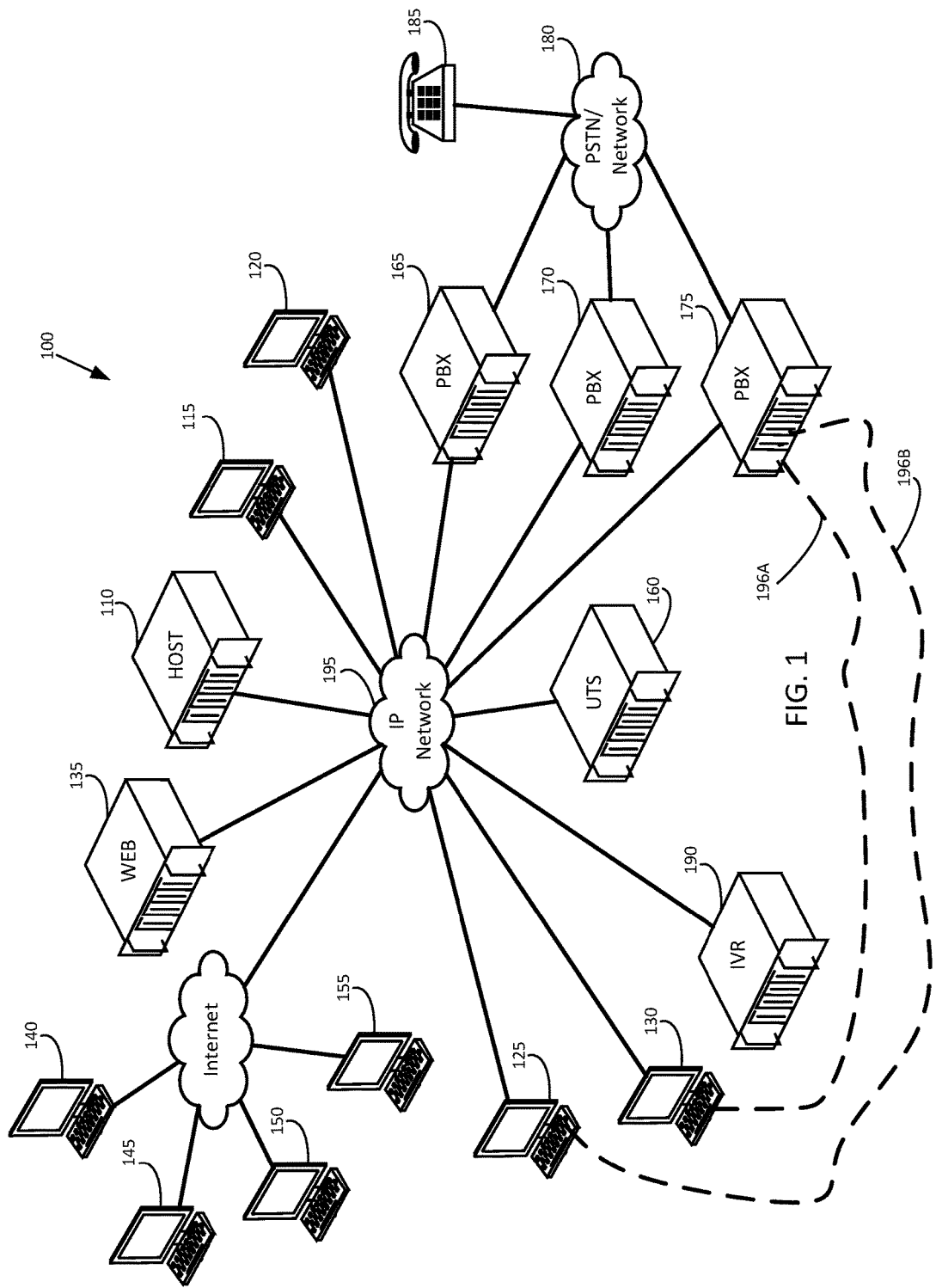
FIG. 1 shows a contact center architecture illustrating the technologies disclosed herein accordingly to various embodiments.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

The embodiments of the invention are discussed herein in the context of a contact center environment. However, those of ordinary skill in the art can readily appreciate the applicability of various embodiments of the invention in other environments such as, for example, hospitals, government agencies, or entities providing emergency and/or hotline services. Thus, the scope of the invention is not intended to be limited to use in a contact center environment and should not be construed as so.

Exemplary Contact Center Architecture

FIG. 1 provides a contact center architecture 100 illustrating the technologies disclosed herein accordingly to various embodiments. Specifically, the contact center architecture 100 is configured in various embodiments to receive calls from and/or originate calls to various parties and depending the embodiment, the architecture 100 may involve transferring the voice audio associated with these calls internally using a number of different technologies such as, for example, voice over internet protocol ("VoIP") and integrated services digital network ("ISDN"). VoIP generally allows the delivery of voice audio for telephone calls over an IP network as the transmission medium by sending voice data in digital packet form using internet protocol while ISDN allows for the delivery of voice audio as a digital transmission over more traditional circuits of the public switched telephone network ("PSTN").

In various embodiments, the architecture 100 includes a host server 110 that controls and handles distribution of calls within the contact center as well as other functions such as, for example, keeping track of, and controlling, agent activity. An agent at the contact center typically makes use of a computing device and telephony device to handle data and voice functionality and the combination of these devices may be referred to as a "workstation." However with that said, in particular instances, the computing device may also act as the telephony device and handle voice functionality via, for example, a soft phone device such as a headset or a virtual telephone implemented in part by an application program executing on the computing device.

Some agents' workstations 115, 120, 125, 130 (e.g., premise-based agents) may be in direct communication with the host server 110 over some type of network 195 such as, for example, a local area network ("LAN") or wide area network ("WAN"), while other agents' workstations 140, 145, 150, 155 (e.g., work-at-home agents) may establish communication with the host server 110 thru an intermediary such as a web server 135 over the Internet. For instance, for a work-at-home agent to establish communication with the host server 110, the agent may enter a particular URL in a browser on his workstation 140, 145, 150, 155 to access a website provided by the web server 135. Once the website has been accessed, the agent may then be required to login (e.g., enter login credentials) to gain access to the host server 110. Once the agent has successfully logged in (e.g., provided valid credentials), the host server 100 establishes a connection to the agent's workstation 140, 145, 150, 155 via the web server 135. As for a premise-based agent, the agent typically just logs in on his workstation 115, 120, 125, 130 and the host server 110 establishes a connection directly to the agent's workstation 115, 120, 125, 130 upon receiving valid credentials.

Once a connection is established between an agent's workstation 115, 120, 125, 130, 140, 145, 150, 155 and the host server 110, requests can be sent back and forth through these connections between the various agent workstations 115, 120, 125, 130, 140, 145, 150, 155 and the host server 110. For example, an agent may need to pause a call the agent is currently handling or transfer the call to another agent and may send a request over the connection to the host server 110 so that the server 110 can receive and process the request. In another example, the host server 110 may send a message to an agent's workstation 115, 120, 125, 130, 140, 145, 150, 155 over the connection to inform the agent that a particular call is being routed to the agent to handle. Furthermore, information that is displayed to agents on their workstations 115, 120, 125, 130, 140, 145, 150, 155 may be provided through these connections.

Continuing on, in various embodiments, the contact center architecture 100 may include a universal telephony server ("UTS") 160 that controls telephony functions and acts as a communications layer between the host server 110 and PSTN and/or other types of networks 180 used by telco providers to transfer telephony traffic. For instance, in particular embodiments, the UTS 160 communicates with the host server 110 via a socket connection and is configured to receive outbound call requests from the host server 110 and send the requests to the PSTN and/or other networks 180. Likewise, the UTS 160 is configured to receive inbound calls from the PSTN and/or other networks 180 and send requests to the host server 110 on how to route these calls. Accordingly, the UTS 160 shown in FIG. 1 interfaces with one or more private branch exchanges ("PBXs") 165, 170, 175 which in turn act as the conduit between the UTS 160 and the PSTN and/or other networks 180. Although PBXs are shown in FIG. 1 for handling the call to/from the PSTN, other forms of switching devices could be used in other embodiments. Depending on the circumstances, the PBXs 165, 170, 175 may contain software and/or hardware necessary to interface with the PSTN and/or other networks 180.

To place an outbound call, the host server 110 sends a dial request to the UTS 160 and the UTS 160 processes the request and sends it to one of the PBXs 165, 170, 175. For instance, in particular embodiments, the dial request may identify the line to use to dial out the call and a dial string. In turn, the appropriate PBX 165, 170, 175 receives the dial request, maps the request to the proper technology type for the request (e.g., selects the appropriate channel driver based on the dial string for the request), and sends the request to the technology it matches. The chosen technology then originates the call out to the telco provider via the PSTN or other network 180, as appropriate, based on the settings for the chosen technology. At this point, the telco provider places the call to the intended party and sends the result of the call (e.g., a connect, no answer, busy signal, disconnected number, etc.) to the PBX 165, 170, 175. The PBX 165, 170, 175 processes the result and sends it to the UTS 160. If the result indicates a no answer, busy signal, or disconnected number, the UTS 160 filters out the call. However, if the result indicates a connect for the call, the UTS 160 informs the host server 110 of the connect. In response, the host server 110 informs the UTS 160 to switch the connected call to an agent's workstation 115, 120, 125, 130, 140, 145, 150, 155 to handle. In addition, the host server 110 sends a connect event to the agent's workstation 115, 120, 125, 130, 140, 145, 150, 155 to inform the agent that a call is being connected to him. Accordingly, the agent begins to converse with the party on the call.

In similar fashion, when an inbound call arrives on one of the PBXs 165, 170, 175, the PBX 165, 170, 175 immediately routes the call to the UTS 160 to process. In turn, the UTS 160 may determine whether or not the call should be routed to an interactive voice response system ("IVR") 190. If so, the call is routed to the IVR 190 and the caller interacts with the IVR 190. In turn, the IVR 190 may play voice prompts to solicit information from the party and collect and analyze responses from the party in the form of dual-tone multiple frequency ("DMTF") tones and/or speech. In addition, the IVR 190 may be used to further identify the purpose of the call, such as, for example, prompting the party to provide account information or otherwise obtain information used to service the call. Furthermore, the IVR 190 may interact with other components within the contact center architecture 100, such as a data store (not shown), to retrieve or provide information for processing the call or provide other functionality within the contact center architecture 100 such as voice mail for agents and/or setting up callbacks to remote parties, although such functionality may be provide via other components.

During the caller's interaction with the IVR 190, if the caller opts to speak with an agent, then the UTS 160 sends a request to the host server 110 asking the server 110 where to route the call. In response, the host server 110 selects an available agent to route the call to, sends a request to the UTS 160 to switch the communication channel being used by the call to the available agent's workstation 115, 120, 125, 130, 140, 145, 150, 155, and sends a connect event to the agent's workstation 115, 120, 125, 130, 140, 145, 150, 155 to inform the agent that a call is being connected to him. At this point, the agent begins to converse with the caller.

With respect to agents, the contact center may make use of various technologies depending on the embodiment to establish audio paths for agents for purposes of providing audio for telephone calls. For example, in particular instances, the contact center may make use of session initiation protocol ("SIP") to establish the audio paths (e.g., VoIP call sessions) over an IP network 195 while actual transfer of the audio over the network 195 is provided using real-time transport protocol ("RTP"). While in other instances, the contact center may make use of ISDN to establish audio paths over traditional synchronous digital circuits 196A, 196B to agents' workstations 125, 130 instead of over an IP network 195. In these instances, the agents' workstations 125, 130 may be connected to the host server 110 over the IP network 195 to provide data functionality, while connected to the PBXs 165, 170, 175 over traditional circuits 196A, 196B to provide audio functionality. Other configurations are possible as those of ordinary skill in the art can contemplate in light of this disclosure.

Continuing on with this in mind, in various embodiments, agents' audio paths are maintained in between calls handled by agents so that a call can be routed to a particular agent by simply "bridging" the call onto the agent's audio path. While such a configuration may not be used in every embodiment, doing so can provide advantages that may not otherwise be realized under other configurations. For instance, maintaining agents' audio paths between calls can help to route calls to agents more effectively and help lower call hold times. Since an active audio path is maintained for an agent, a call can be bridged onto the agent's audio path without the party on the call having to wait for the agent to pick up a ringing phone. The agent is already there and ready to converse with the party. This can be extremely important for outbound calls in which having to have a party remain on hold a few seconds on a call before an agent is present can drastically impact whether such a party remains on the call or hangs up. In addition, from an inbound perspective, the contact center may not want to provide an agent with the opportunity to decide whether or not to answer a call for a few seconds while a party on a call remains waiting. Instead, the agent is automatically connected to a call bridged onto his active audio path under such a configuration unless the agent goes into a pause state.

Figure 2:
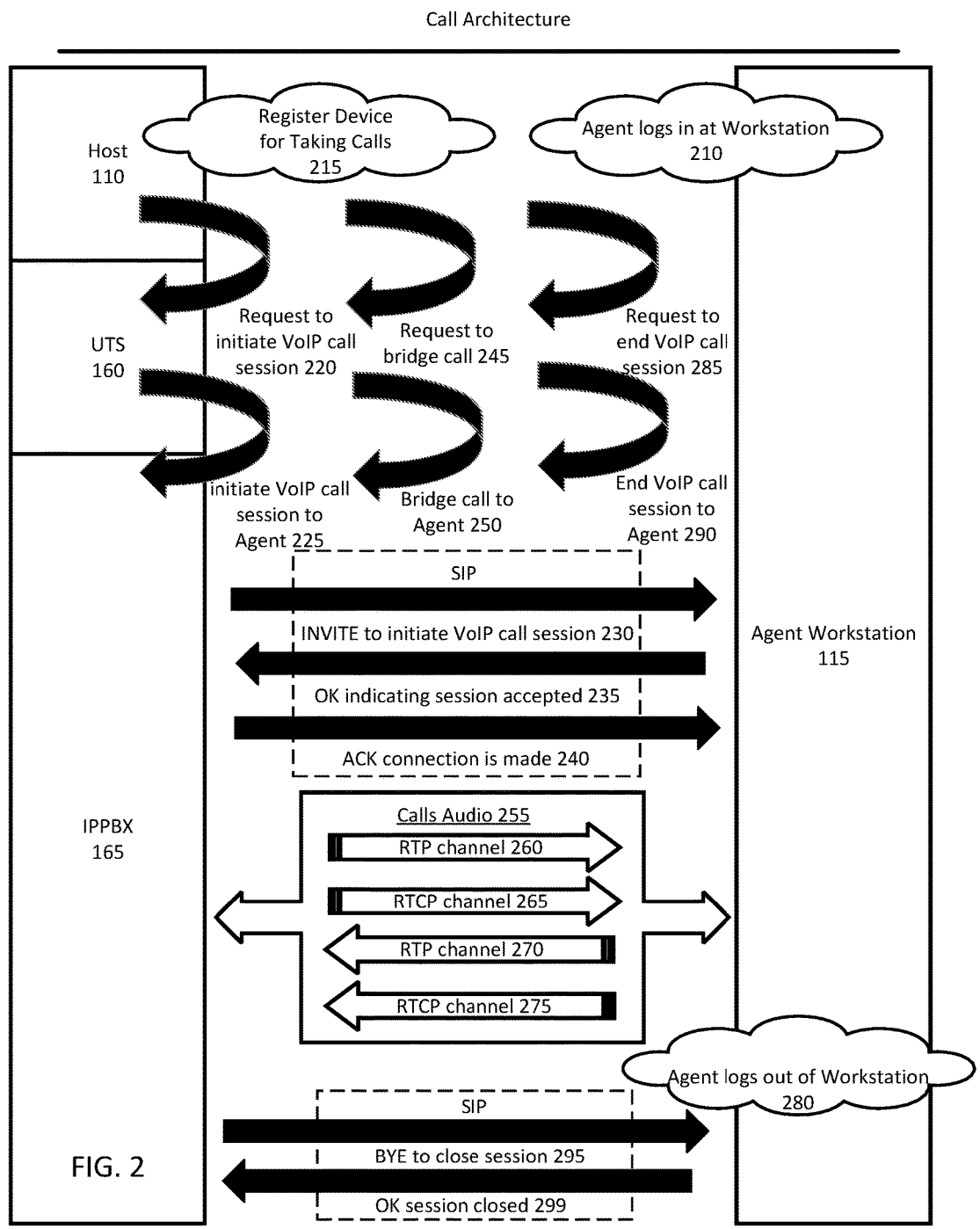
FIG. 2 shows a diagram of a contact center call architecture according to various technologies disclosed herein.

To better demonstrate such a configuration, a diagram of a call architecture is provided in FIG. 2 on how calls are routed to an agent according to an embodiment in which the agent's audio path is established using VoIP and maintained in between the calls handled by the agent. An agent logs in 210 at his workstation 115 by providing valid credentials and the host server 110 registers 215 the agent's workstation's IP address for taking calls. At this point, the host server 110 sends a request 220 to initiate a VoIP call session (audio path) with the agent's workstation 115 to the UTS 160 and in turn, the UTS 160 instructs 225 one of the PBXs 165 to initiate a VoIP call session to the agent's workstation 115.

The PBX 165 sends and INVITE 230 using SIP to the agent's workstation 115 to initiate a VoIP call session. In turn, the agent's softphone rings, the agent answers the call, and the agent's workstation 115 responds by sending an OK 235 back to the PBX 165 indicating the session is accepted. Accordingly, the PBX 165 sends an ACK 240 to the agent's workstation 115 to indicate a successful connection (VoIP call session) has been made and a message may be played to the agent informing him of the successful connection. At this point, the agent does not hang up and remains on the active VoIP call session. In addition, a message may be sent to the host server 110 conveying a successful VoIP call session has been established to the agent's workstation 115 and the host server 110 may then recognize the agent's workstation 115 is ready to receive telephone calls.

Accordingly, when a telephone call is to be routed to the agent, the host server 110 sends a request 245 to the UTS 160 to bridge the call onto the agent's VoIP call session. In addition, the host server 110 may send an indication to the agent's workstation 115 to inform the agent that a call is being routed to the agent. For instance, the indication may be a button lighting up on the agent's workstation or some type of sound may be provided over the agent's phone. In turn, the UTS 160 instructs 250 the PBX 165 (or some other PBX 170, 175, depending on which PBX 165, 170, 175 is currently handling the inbound or outbound call that is to be routed to the agent) to bridge the call onto the agent's VoIP call session and the PBX 165 does so. At this point, the agent and the remote party can converse on the call.

As the remote party speaks to the agent, the party's audio 255 (voice) is carried over a first RTP channel 260 to the agent's workstation 115. Likewise, as the agent speaks to the remote party, the agent's audio 255 (voice) is carried over a second RTP channel 270 from the agent's workstation 115 to the PBX 165 and out over the PSTN and/or other networks 180 to the remote party's telephony device. In addition, corresponding RTP control protocol ("RTCP") channels 265, 275 are provided for each of the RTP channels 260, 270. As is further discussed herein, RTCP is used to monitor transmission statistics and quality of service (QoS) for the audio delivered over a RTP channel. QoS is generally concerned with how to guarantee that packet traffic for a voice call will not be delayed or lost due to interference from other traffic on the network. Therefore, during the call, the first RTCP channel 265 corresponding to the first RTP channel 260 carrying the remote party's audio 255 carries transmission statistics for the first RTP channel 260 and the second RTCP channel 275 corresponding to the second RTP channel 270 carrying the agent's audio 255 carries transmission statistics for the second RTP channel 270.

At the completion of the call, the agent does not hang up his phone but instead performs some function such as select a button on his workstation 115 that results in a message being sent to the host server 110 informing the server 110 that the call is complete. Accordingly, the host server 110 may then send a request to the UTS 160 informing the UTS 160 that the call no longer needs to be bridged onto the agent's VoIP call session and in turn, the UTS 160 may instruct the PBX 165 to tear down the bridge. However, the agent's VoIP call session is maintained. Thus, as a result, technically speaking, the agent is still actively on a call, although a remote party is not on the other end of the call. That is to say, the agent's VoIP call session is still active, although a call involving a remote party is not currently bridged onto the agent's active VoIP call session. At this point, the agent may simply hear silence or some type of comfort noise such as music over his phone as he waits for another call from a remote party to be bridged onto his active VoIP call session. When another call is to be routed to the agent, the host server 110 again follows the same procedure and has the call bridged onto the agent's active VoIP call session. The host server 110 repeats this process for each call 230 routed to the agent while the agent is actively handling calls.

When the agent is done handling calls (e.g., the agent's work shift has ended), the agent may log out 280 of his workstation 115 and as a result, the host server 110 unregisters the agent's workstation 115 for taking calls and sends a request 285 to the UTS 160 to end the agent's active VoIP call session. In turn, the UTS 160 instructs 290 the PBX 165 to end (tear down) the agent's VoIP call session. The PBX 165 responds by sending a BYE 295 to the agent's workstation 115 using SIP to close down the agent's VoIP call session and the agent's workstation 115 responds by returning an OK 299 indicating the session is closed. At this point, no further calls can be routed to the agent.

Returning now to FIG. 1, as for calls originated or received by the contact center, the remote parties involved in these calls may make use of a variety of different telephony devices 185. For instance, a party may receive or place a call using a conventional analog telephone connected to the PSTN 180 using an analog plain old telephone service ("POTS") line and routed using various types of facilities, including, but not limited to: T1 trunks, SONET based fiber optic networks, ATM networks, etc., as well as various types of routers, switches, bridges, gateways, and other types of equipment to process the call. In addition, a party may receive or place a call using a device 185 such as a desktop or laptop computer, a smart phone, mobile phone, tablet, or other mobile device. Depending on the device 185, these calls may be placed or received via a telco provider, an Internet provider, and/or wirelessly via a mobile service provider ("MSP").

Finally, it is noted that although a number of the above entities may be referred to as a "server," each may also be referred to in the art as a "computing device," "unit," "component," or "system." An entity may incorporate a local data store and/or interface with an external data store. Use of the word "server" does not necessarily require the entity to interact in a formal client-server arrangement with other entities, although that may be the case. Further, the above entities may be located remotely from (or co-located with) other entities. Furthermore, one or more of the entities may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the entities identified above must be actually located in a contact center location or controlled by a contact center operator. Those skilled in the art will recognize FIG. 1 represents one possible configuration of a contact center architecture 100, and variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Monitoring Module

Figure 3:
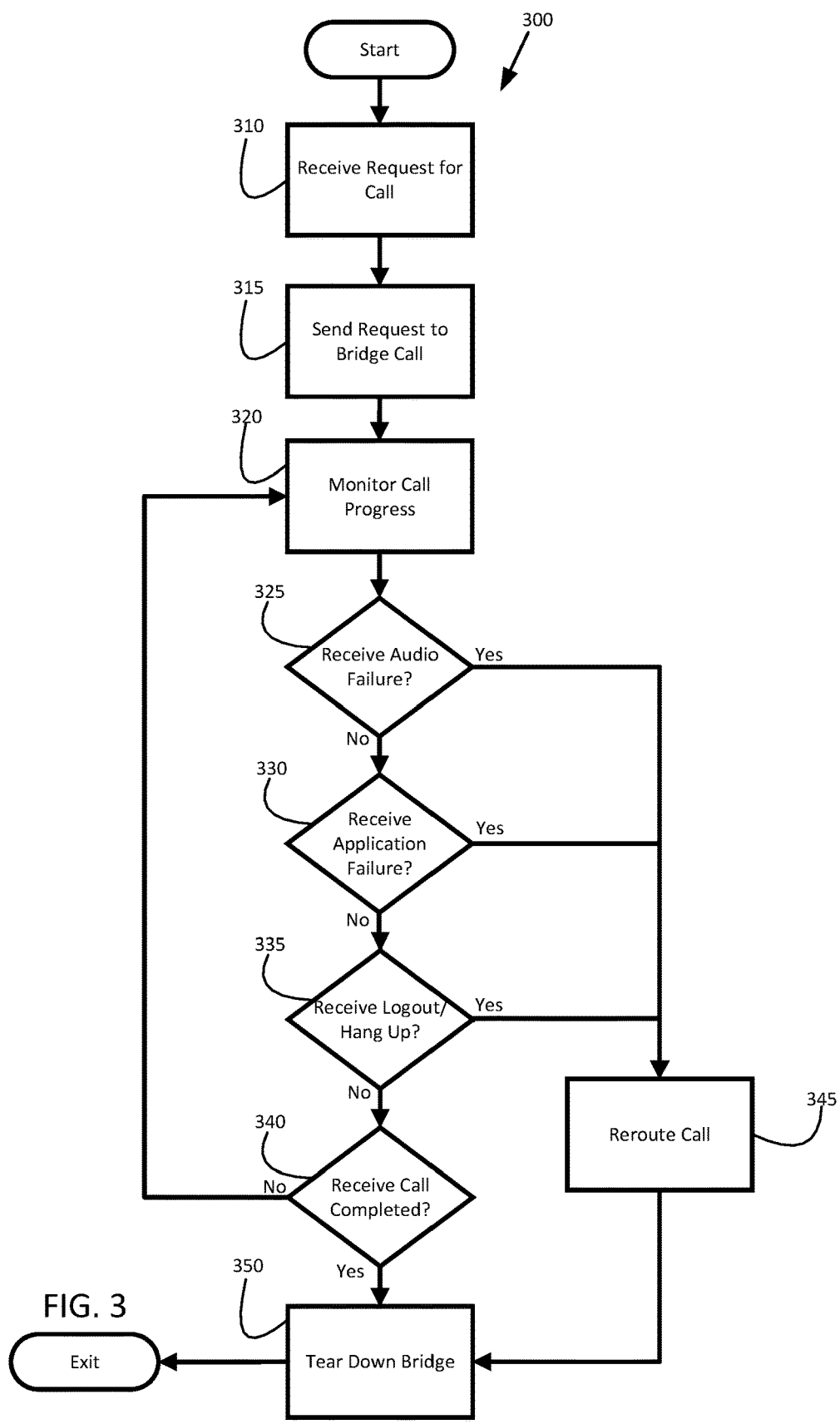
FIG. 3 is a flowchart illustrating a monitoring module that can be used in accordance with various embodiments of the present invention.

Turning now to FIG. 3, additional details are provided regarding the process flow for monitoring a call routed to an agent according to various embodiments of the invention. In particular, FIG. 3 is a flow diagram showing a monitoring module for performing such functionality according to various embodiments of the invention. For example, the flow diagram shown in FIG. 3 may correspond to operations carried out by one or more processors in one or more components, such as, for example, the host server 110 described above, as it executes the monitoring module stored in the component's volatile and/or nonvolatile memory.

The monitoring module begins the process 300 by receiving a request for a call in Operation 310. For instance, in particular embodiments, the request may be received from the UTS 160 asking where to route a particular inbound or outbound call. In response, the monitoring module identifies an available agent and sends a request back to the UTS 160 identifying an agent's audio path to bridge the call onto in Operation 315. In addition, the monitoring module may send the selected agent a notification to the agent's workstation 115, 120, 125, 130, 140, 145, 150, 155 informing the agent the call is being routed to him. At this point, the UTS 160 instructs the appropriate PBX 165, 170, 175 to bridge the call onto the agent's audio path and the PBX 165, 170, 175 does so. Accordingly, the monitoring module begins to monitor call progress in Operation 320.

As the monitoring module monitors call progress, the module determines whether or not an audio failure has been received in Operation 325. For instance, as discussed below, in particular embodiments, the PBX 165, 170, 175 servicing the audio path of the agent who is handling the call may detect an audio failure and send a message thru the UTS 160 to the monitoring module. This audio failure indicates some type of defect has been detected with respect to the agent's audio path. In some instances, the agent's audio path may have been completely lost. For example, a work-at-home agent who is using VoIP and is connected over the Internet to the contact center may suddenly lose Internet service, thus severing the agent's audio path with the PBX 165, 170, 175. While in other instances, an agent's audio path may still be active however the quality of audio being provided over the audio path is poor. For example, the audio for a particular call may be carried over VoIP to the agent and the network 190 supporting the agent's audio path may be experiencing high traffic that results in lost data packets and/or jitter that negatively affects the quality of the call.

At this point if an audio failure has not been received, the monitoring module then determines whether or not the application supporting the agent's workstation 115, 120, 125, 130, 140, 145, 150, 155 is experiencing a failure that may hinder the agent in handling the call in Operation 330. For instance, the application supporting the agent's workstation 115, 120, 125, 130, 140, 145, 150, 155 may be providing one or more screens on the workstation 115, 120, 125, 130, 140, 145, 150, 155 and this application may become frozen or locked up so that the agent is unable to perform any functionality on these screens. As a result, the agent may be unable to continue to help the remote party on the call until his workstation 115, 120, 125, 130, 140, 145, 150, 155 is functioning again, although the agent's audio path may still be active and the agent may still be able to converse with the remote party. In addition, the agent's workstation 115, 120, 125, 130, 140, 145, 150, 155 becoming frozen or locked up may signal that the agent's audio path is about to be lost.

Thus, in various embodiments, the monitoring module makes a determination of whether or not the application supporting the agent's workstation 115, 120, 125, 130, 140, 145, 150, 155 is experiencing a failure by sending a request to the agent's workstation 115, 120, 125, 130, 140, 145, 150, 155 (to the application supporting the agent's workstation 115, 120, 125, 130, 140, 145, 150, 155) and determining whether it receives a response back from the agent's workstation 115, 120, 125, 130, 140, 145, 150, 155 in a timely fashion (e.g., within a time threshold). If so, then the application supporting the agent's workstation 115, 120, 125, 130, 140, 145, 150, 155 is functioning properly. If not, then the application supporting the agent's workstation 115, 120, 125, 130, 140, 145, 150, 155 is likely experiencing a failure.

At this point if the application supporting the agent's workstation 115, 120, 125, 130, 140, 145, 150, 155 is functioning properly, the monitoring module determines whether the agent has logged out or hung up while still actively handling the call in Operation 335. Normally, the agent takes some proactive measure such as selecting a logout button on his workstation 115, 120, 125, 130, 140, 145, 150, 155 to indicate he would like to logout and no longer take calls. In turn, the host server 110 receives such a request and responds by tearing down the agent's audio path and disconnecting from the agent's workstation 115, 120, 125, 130, 140, 145, 150, 155. Similarly, at the end of a call, the agent takes some proactive measure to provide an indication a call is completed and the host server 110 responds by tearing down the bridge for the call, although the agent's audio path is maintained.

However with that said, the agent may inadvertently or unintentionally log out of his workstation 115, 120, 125, 130, 140, 145, 150, 155 or hang up his telephony device while actively on a call, thus severing his audio path before the call has completed. Therefore, in various embodiments, the monitoring module is configured to determine when such an occurrence has taken place. For instance, in particular embodiments, the monitoring module makes such a determination based on receiving a request to log out the agent or a message signaling the agent's audio path is to be torn down (such as a SIP BYE or an ISDN DISCONNECT) while the agent is still actively on the call. If the monitoring module determines such a request or message has been received, then the monitoring module determines the agent has inadvertently or unintentionally logged out or hung up while still actively handling the call.

Accordingly, under prior art systems, the remote party is typically disconnected from the contact center and the call is lost when an audio path failure, application failure (with subsequent audio path failure), or an accidental/inadvertent logout or hang up occurs while the agent is actively on a call. As a result, the contact center loses the opportunity to engage with the remote party with respect to why either party is contacting the other in the first place. Furthermore, the remote party may find being disconnected under such circumstances annoying and frustrating. Thus, a contact center under a prior art system not only loses the opportunity to engage with the remote party but also likely damages customer relationships by disconnecting the call due to a technical issue.

However, the monitoring module in various embodiments provides an improved mechanism for handling such situations by having the call rerouted in Operation 345 instead of losing the call. For instance, the monitoring module may request the host server 110 to have the call immediately rerouted (bridged off the agent's audio path and bridged onto another audio path) to another agent or component within the contact center such as an IVR 190. Thus, by utilizing the monitoring module to reroute the call instead of disconnecting the call, the contact center does not lose the opportunity to engage with the remote party and may avoid the party becoming annoyed or frustrated by being disconnected due to a technical issue. At this point, the monitoring module has the bridge to the agent's audio path torn down in Operation 350 for the call since the call has been rerouted to another agent or component.

Returning now to Operation 335, if the monitoring module determines the agent has not logged out or hung up his telephony device, then the monitoring module determines whether the call has completed in Operation 340. As previously mentioned, the agent may provide some type of mechanism to signal to the host server 110 that the call has completed. For instance, the agent may select a button provided on his workstation that sends a message to the host server 110 that the call has completed. For example, the agent may be expected to perform "after-call work" to wrap up a call once the agent has completed speaking with the remote party. This after-call work may entail the agent entering information into his workstation 115, 120, 125, 130, 140, 145, 150, 155 such as, for example, problem resolution information for a technical call or sales order information for a sales call. Once the agent has finished speaking with the remote party and is ready to perform the after-call work, the agent may then select a button on his workstation 115, 120, 125, 130, 140, 145, 150, 155 and a message may be sent to the host server 110 signaling to the server 110 that the call routed to the agent has completed. Accordingly, if the monitoring module determines the call has completed, then the monitoring module tears down the bridge for the call in Operation 350. Otherwise the monitoring module returns to Operation 320 and continues to monitor call progress.

Check Audio Module

Figure 4:
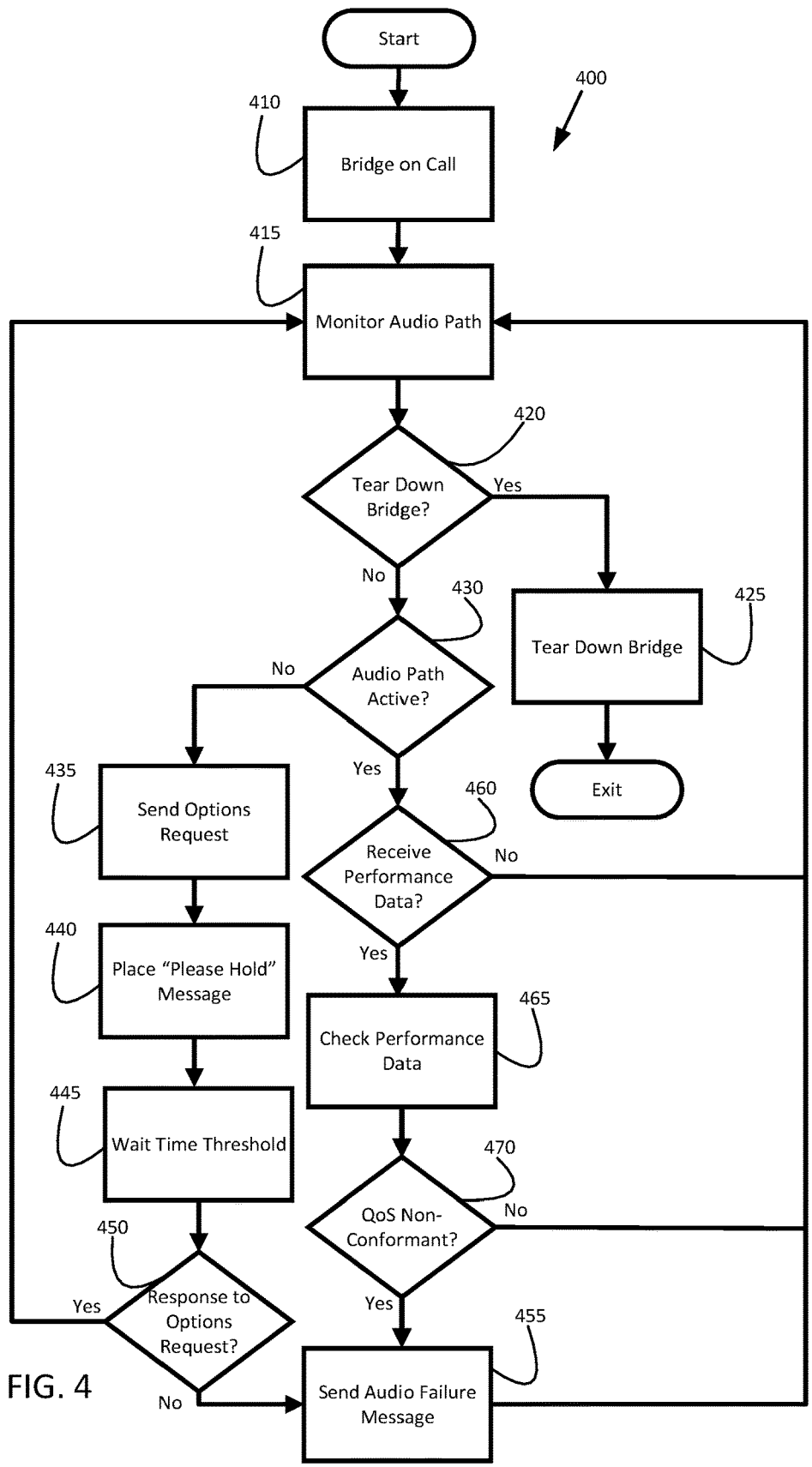
FIG. 4 is a flowchart illustrating a check audio module that can be used in accordance with various embodiments of the present invention.

Turning now to FIG. 4, additional details are provided regarding the process flow for confirming an agent's audio according to various embodiments of the invention. In particular, FIG. 4 is a flow diagram showing a check audio module for performing such functionality according to various embodiments of the invention. Like the flow diagram discussed above for the monitoring module, the flow diagram shown in FIG. 4 may correspond to operations carried out by one or more processors in one or more components, such as, for example, a PBX 165, 170, 175 described above, as it executes the check audio module stored in the component's volatile and/or nonvolatile memory.

As already discussed, the monitoring module initiates bridging a call onto a particular agent's audio path by sending a request to the UTS 160 and in turn, the UTS 160 instructs the appropriate PBX 165, 170, 175 to bridge the call onto the selected agent's audio path. Accordingly, the check audio module begins the process 400 by bridging the call onto the selected agent's audio path in Operation 410 and monitoring the audio path in Operation 415.

At this point, the check audio module determines whether an instruction has been received from the UTS 160 to tear down the bridge in Operation 420. For instance, the agent may complete the call and send a notification (message) to the host server 110 indicating the call has completed. In turn, the host server 110 sends a request to the UTS 160 to tear down the bridge for the call routed to the agent and the UTS 160 sends instructions to the PBX 165, 170, 175 to do the same. Therefore, if the check audio module determines such an instruction has been received, then the check audio module tears down the bridge in Operation 425. Otherwise, the check audio module determines whether or not the agent's audio path is active in Operation 430.

With respect to VoIP traffic, the check audio module may be configured according to various embodiments to perform one or more operations to determine whether the agent's audio path is active or has been lost. For instance, in particular embodiments, the check audio module may be configured to send a particular type of SIP message (e.g., UPDATE or OPTIONS request) over the agent's audio path to serve as a ping mechanism and determine whether the audio path has been lost for the agent. If the check audio module receives a response to the SIP message, then the agent's audio path is still active. If not, then the agent's audio path has been lost.

However, quickly detecting the loss of the agent's audio path can be critical because the remote party is also likely to realize quickly (e.g., within a few seconds) the agent is no longer on the call and hang up. Thus, a configuration involving the check audio module sending a SIP message to detect a lost audio path may be limited in some instances because sending such messages often enough (e.g., every one or two seconds) so that the check audio module can timely determine whether or not the agent's audio path has been lost may lead to too much traffic being sent over the supporting network 195 and negatively affect call quality.

Thus, in other embodiments, the check audio module may be configured to determine whether or not audio data is present on the RTP channel carrying the agent's audio (and/or the RTP channel carrying the remote party's audio) to determine whether the agent's audio path is active or has been lost. If audio data is not present on the RTP channel, then such an occurrence may signal the agent's audio path has been lost. In many instances, this configuration may be more desirable over simply sending SIP messages because the check audio module can detect missing audio data on the RTP channel in a short amount of time (e.g., within five hundred milliseconds to one second) without the concern of causing too much traffic to be sent over the network 195. However, other reasons may account for a temporary loss (lack) of audio data on the RTP channel besides the agent's audio path being lost. For example, one or more data packets may merely be lost or delayed although the agent's audio path is still active. Thus, configuring the check audio module to simply check whether or not audio data is present on the agent's (and/or remote party's) RTP channel to determine whether the agent's audio path is lost may lead to false positives.

Therefore, to combat such false positives, the check audio module is configured in particular embodiments to send a SIP message such as an OPTIONS request to confirm whether or not the agent's audio path has actually been lost. An OPTIONS request allows a device to query another device as to the device's capabilities. For instance, the OPTIONS request allows the PBX 165, 170, 175 to discover information about the methods, content types, extensions, codecs, etc., the agent's softphone supports without having to "ring" the softphone. However, the OPTIONS request can also be used as a SIP ping mechanism to determine whether the agent's softphone is there and communicating with the PBX 165, 170, 175. Therefore, upon determining audio data is not being received on the agent's audio path, the check audio module in various embodiments sends an OPTIONS request over the audio path in Operation 435.

Typically, a response from the agent's softphone to the OPTIONS request may take a few seconds to be received by the check audio module. Therefore, in particular embodiments, the check audio module is configured to play a message to the remote party in Operation 440 informing the remote party that a technical problem may have been encountered and to ask the party to please hold on the line. At this point, the check audio module waits a time threshold to receive the response to the OPTIONS request in Operation 445 and upon the threshold expiring, determines whether a response has been received from the agent's softphone in Operation 450. If a response is received, then the agent's softphone is there and the agent's audio path is still active. Accordingly, the check audio module returns to Operation 415 and continues to monitor the call.

However, if a response is not received, then the check audio determines the agent's audio path has been lost and sends an audio failure message in Operation 455. As previously discussed, the audio failure message may be sent to the UTS 160 and the UTS 160 may forward the message to the host server 110 (e.g., the monitoring module). Accordingly, the host server 110 reacts by rerouting the call to another agent or component in the contact center. As a result, the call is not lost due to the unexpected loss of the agent's audio path and the contact center is able to continue to interact with and engage the remote party.

As for ISDN traffic, if the check audio module determines that information frames are no longer being received from the agent's telephony device over the basic rate interface ("BRI") layer two, then the module knows the agent's audio path has been lost. The BRI layer two, known as Link Access Procedure, D Channel (also known as LAPD), is used across the D channel to ensure that control and signaling information flows and is received properly. Thus, if the check audio module detects no information frames are being received over this layer from the agent's phone device, the check audio module reroutes the call. In these instances, a confirmation operation (such as sending the OPTIONS request for VoIP) and waiting a time threshold is not necessarily needed since not receiving information frames from the agent's phone device positively identifies the agent's audio path is lost and the agent is no longer present on the call. In addition, the check audio module may or may not play a message to the remote party asking the party to remain on the line while the call is rerouted since the check audio module does not necessarily need to wait a time threshold to perform a confirmation operation and can almost immediately reroute the call.

Returning now to Operation 430 in FIG. 4, if the check audio module instead determines the agent's audio path is active, then the check audio module determines whether performance data has been received in Operation 460. As previously mentioned, with respect to VoIP traffic, every RTP channel used to carry audio during a telephone call has a corresponding RTCP channel. As further mentioned, the primary function of this RTCP channel is to provide feedback on the QoS in distributing the audio by periodically sending statistical information during the audio session allowing for non-intrusive quality monitoring. Some of this statistical information includes transmitted octet and packet counts, packet loss, packet delay variation, and delay time. In general, the RTCP channel periodically transmits control packets to all of the participants in a session. For instance, the recommended time interval between transmitting control packets is five seconds, although the statistical information should be sent as often as bandwidth constraints will allow to maximize the resolution of the statistics.

With this in mind, control packets are transmitted in a compound RTCP packet and may include a sender report, a receiver report, a source description, a goodbye, and application-specific messages that serve as application-specific extensions to RTCP. The sender report is periodically sent by an active sender in a session to report transmission and reception statistics for all RTP packets sent during a particular interval. The receiver report is periodically sent by passive participants who do not send RTP packets and informs the other participants about the QoS. The source description provides the CNAME identifier (a persistent transport-level identifier for an RPC source) to other session participants and may also provide additional information such as the name, e-mail address, telephone number, and address of the owner or controller of the source. The goodbye is sent to shut down a particular stream (RTP channel) and allows a source to announce that it is leaving the session.

Here, the sender and receiver reports are of particular interest with respect to various embodiments of the invention. This is because these two reports provide reception quality feedback from RTP receivers who are participants in the session. The only difference between the sender report and the receiver report, besides the packet type code, is that the sender report includes a 20-byte sender information section for use by active senders. The sender report is issued if a participant has sent any RTP data packets during the interval since issuing the last report or the previous one, otherwise the receiver report is issued.

With that said, each of these types of reports includes a reception report block for each of the sources (participants) from which the receiver has received RTP data packets since transmission of the last report and this reception report block provides statistics about the data received from the particular source. Therefore, in the context of a telephone call involving an agent and remote party, a report issued by the agent will include a reception report block providing statistics on the RTP data packets received from the PBX 165, 170, 175 over the agent's active audio path since transmission of the last report and, likewise, a report issued by the PBX 165, 170, 175 will include a reception report block providing statistics on the RTP data packets received from the agent over the agent's active audio path since transmission of the last report. Accordingly, these statistics provided in a reception report block are used in various embodiments to evaluate the current QoS being provided on the agent's and/or remote party's RTP channels and the evaluation is then used to determine whether to reroute the call being conducted between the agent and remote party.

Therefore, if the check audio module determines performance data has been received, the check audio module checks the performance data (performance statistics) provided in the report (sender and/or receiver) of the compound RTCP packet in Operation 465. Depending on the embodiment, the check performance module may be configured to check one or more of the statistics provided in the report such as, for example, the fraction of RTP data packets from the source (e.g., either the agent or remote party) lost since the previous compound RTCP packet was issued for the agent's or remote party's RTP channel. In addition, the check performance module may check the cumulative number of RTP data packets from the source that have been lost since the beginning of the session, the interarrival jitter providing an estimate of the statistical variance of the RTP data packet interarrival time, and/or the delay between receiving the last compound RTCP packet from the source and sending this compound RTCP packet. Those of ordinary skill in the art can envision other statistics that may be checked or derived based on the statistics provided in the report found in the compound RTCP packet.

Once the check audio module has checked the preferred performance statistics, the module determines whether the statistics indicate the QoS is non-conformant (e.g., whether one or more statistic measures are above or below threshold values) in Operation 470. This particular operation is performed to determine whether the QoS has dropped to a level that warrants rerouting the call. For instance, in particular embodiments, the check performance module may use the fraction of RTP data packets lost since the previous report. This fraction is defined to be the number of packets lost divided by the number of packets expected. Thus, a high fraction of RTP data packets lost indicates a high number of data packets expected to be delivered from the source were never received, which indicates poor call quality between the agent and the remote party. Therefore, in this instance, the check performance module may be configured to determine whether the fraction of RTP data packets lost is above a threshold value and if so, the check audio module sends an audio failure message in Operation 455.

As those of ordinary skill in the art will understand in light of this disclosure, any number of different statistics can be relied on in determining whether a call should be rerouted. For example, in another instance, the check audio module may use the interarrival jitter level (in addition to or instead of the fraction of RTP data packets lost) as a short-term measure to identify network congestion before it leads to substantial packet loss. For instance, since this particular field is only a snapshot of the jitter at the time of the report, the measure is not generally intended to be taken quantitatively but instead is intended to be compared with a number of reported measures. Therefore, the contact center may be able to establish a threshold value for this field based on historical measurements that can serve as a predictor of when congestion may likely lead to substantial packet loss. Thus, when a current interarrival jitter level is above the established threshold value, such an occurrence indicates congestion is likely to rise to a level that may lead to substantial packet loss and as a result, the check audio module sends an audio failure message at Operation 455 to avoid such congestion. At this point, whether or not the check audio module determines the QoS is non-conformant and sends an audio failure message, the module returns to monitoring the agent's audio path until the bridge for the call is torn down.

As for ISDN traffic, performance information is not necessarily delivered on a channel in a separate and distinct information frame. However, an entity involved as an endpoint in ISDN traffic is aware when an information frame received or transmitted is corrupt and needs to be retransmitted. Accordingly, receiving or sending a significant number of information frames that need to be retransmitted can signal the parties involved in a call (e.g., an agent and a remote party) are experiencing quality issues while on the call. Therefore, in particular embodiments, the check audio module can be configured to keep track of when information frames need to be retransmitted and check the count of retransmissions against a threshold value to determine whether or not a call should be rerouted. Thus, turning back to FIG. 4, the check audio module in these particular embodiments determines whether or not performance information has been received in Operation 460 based on whether or not either of the last information frames received or sent by the PBX 165, 170, 175 had to be retransmitted. If so, then the check audio module checks the performance data in Operation 465 by incrementing the count of retransmissions and checks the count against a threshold value. If the count of retransmissions is over the threshold value, then the check audio module determines the QoS provided over the agent's audio path is non-conformant in Operation 470 and sends an audio failure message in Operation 455.

Handle Reroute Module

As previously mentioned, when a determination is made to reroute a call, the call may be rerouted to a number of different options depending on the embodiment. For instance, once the monitoring module determines a call should be rerouted, the module may request the host server 110 to reroute the call. In turn, the host server 110 may determine where the call should be rerouted to and send a request to the UTS 160 to un-bridge the call from the agent's audio path who is currently handling the call and to bridge the call onto a newly determined audio path. Depending on the embodiment, the newly determined audio path may be for any number of different options such as, for example, an IVR 190, a different agent at the contact center, or an automated answering system such as voice mail.

Figure 5:
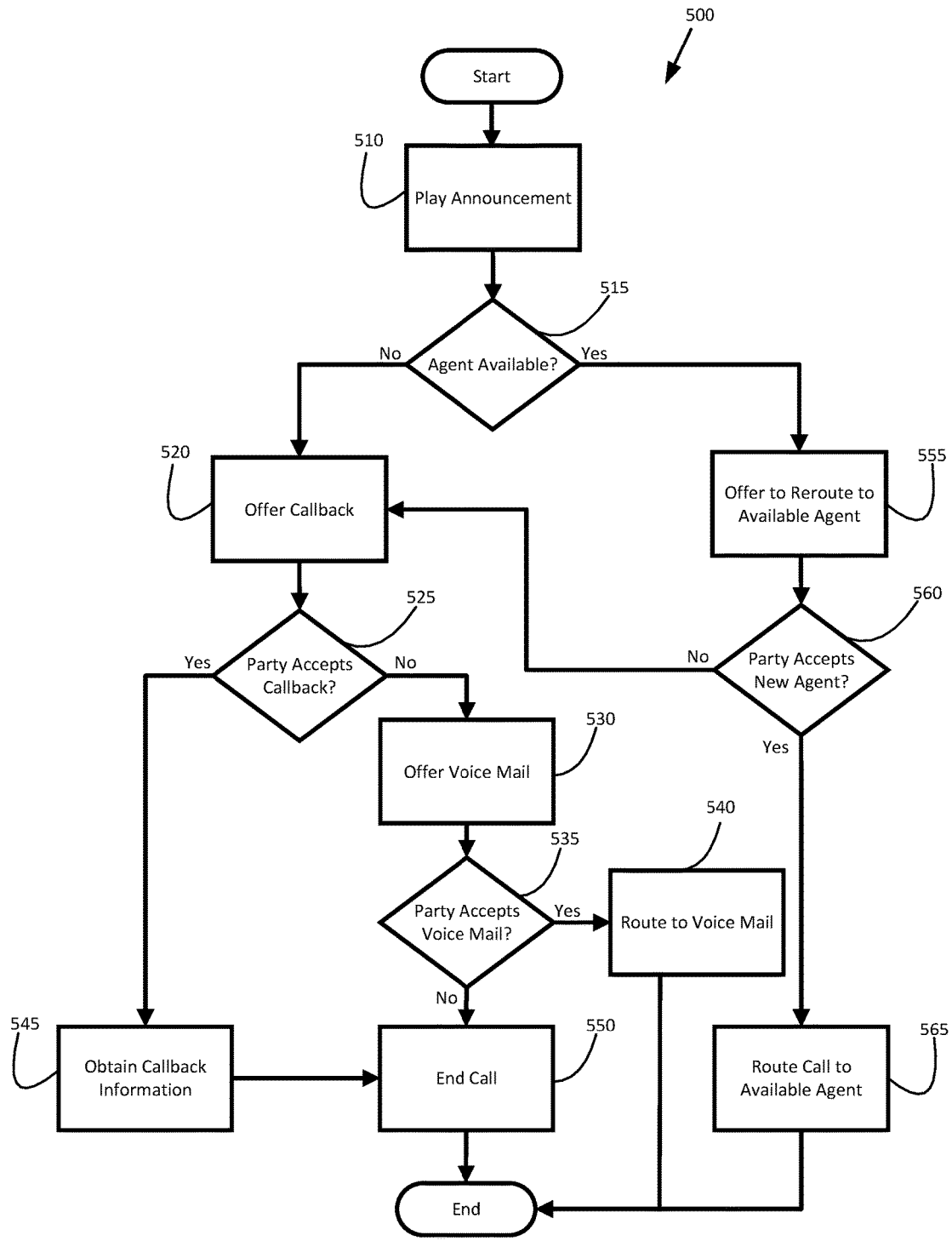
FIG. 5 is a flowchart illustrating a handle reroute module that can be used in accordance with various embodiments of the present invention.

Thus, turning now to FIG. 5, additional details are provided regarding a process flow for handling a call rerouted to one of these options, specifically an IVR 190, according to various embodiments of the invention. In particular, FIG. 5 is a flow diagram showing a handle reroute module for performing such functionality according to various embodiments of the invention. In this particular instance, the flow diagram shown in FIG. 5 corresponds to operations carried out by the IVR 190, as it executes the handle reroute module stored in the IVR's volatile and/or nonvolatile memory.

Accordingly, upon the call being bridged onto an audio path for the IVR 190, the handle reroute module begins the process 500 by playing an announcement to the remote party on the call in Operation 510. Typically, the announcement informs the remote party that the call has been rerouted due to quality concerns and asks the remote party to please stay on the line. At this point, the handle reroute module determines whether another agent is available to handle the call in Operation 515. For instance, the handle reroute module may send a request to the host server 110 to inquire whether an agent is available to handle the call. In addition, in particular embodiments, the handle reroute module may first check to see whether the agent who was originally handling the call has had his audio path restored and is now available before inquiring about the availability of a different agent. If an agent is not available, then the handle reroute module in this particular instance offers a callback to the remote party in Operation 520.

In Operation 525, the handle reroute module determines whether the remote party has accepted receiving a callback. If the remote party has accepted receiving a callback, the handle reroute module obtains callback information from the remote party in Operation 545. For instance, the handle reroute module may request the remote party to provide a time and telephone number for the callback. In some instances, the handle reroute module may recommend one or more times for receiving the callback to the remote party and have the remote party select one of the recommended times. Those of ordinary skill in the art can envision other ways in which the handle reroute module may obtain callback information from the remote party in light of this disclosure. Once the handle reroute module has obtained the callback information, the handle reroute module ends the call in Operation 550.

However, if instead the remote party does not accept receiving a callback, the handle reroute module in this particular instance offers the remote party to leave a voice mail for the agent that was originally handling the call (or some other person) in Operation 530. If the handle reroute module determines the remote party would like to leave a voice mail in Operation 535, then the handle reroute module routes the call to the agent's voice mail in Operation 540. This operation may entail the handle reroute module sending a request to the host server 110 (and in turn, the UTS 160) to bridge the call onto the agent's voice mail.

Returning to Operation 515, if instead the handle reroute module determines an agent is currently available to handle the call, then the handle reroute module offers to the remote party to have the call rerouted to the available agent in Operation 555. The handle reroute module then determines whether the remote party accepts the offer in Operation 560. If the remote party does not accept the offer, then the handle reroute module moves to Operation 520 and offers a callback to the remote party. At this point, the process flow as discussed above is carried out. However, if the remote party does accept the offer, then the handle reroute module routes the call to the available agent in Operation 565 by sending a request to the host server 110 (and in turn, the UTS 160) to bridge the call onto the available agent's audio path. At this point, the remote party can begin conversing with the new agent and the handle reroute module exits.

It is noted that in particular embodiments, the handle reroute module may also assign a call to be rerouted to another agent to a specially-defined call campaign to help the agent who is receiving the rerouted call in handling the call. That is to say, this specially-defined call campaign may have defined features that provide helpful functionality to the agent in fielding the rerouted call. For instance, in particular embodiments, the specially-defined call campaign may have one or more associated scripts assigned to the campaign that perform functionality to help the agent upon receiving a rerouted call. For example, the specially-defined call campaign may include a script that informs the agent on his workstation 115, 120, 125, 130, 140, 145, 150, 155 that the call he is receiving has been rerouted to him because of audio problems and provides the agent with verbiage to speak upon taking the call such as, for example, "sorry, but I understand that you were just dropped from the agent who was helping you, but can I help you with your question?"

In addition, the specially-defined call campaign may provide other functionality such as information retrieval in which the information from the previous agent's workstation 115, 120, 125, 130, 140, 145, 150, 155 is retrieved and provided on the new agent's workstation 115, 120, 125, 130, 140, 145, 150, 155 so that the new agent is able to see the information that the previous agent had available or was providing on his workstation 115, 120, 125, 130, 140, 145, 150, 155 prior to the call being rerouted. For example, the previous agent may have been entering information for a purchase order when his audio path was lost and the call was rerouted. Accordingly, if such information is retrieved and provided on the new agent's workstation 115, 120, 125, 130, 140, 145, 150, 155 then the new agent can pick up where the previous agent left off in entering the purchase order information without having to start over.

Finally, it should be understood that such a specially-defined call campaign could be used in various embodiments outside the context of the handle reroute module. For example, the monitoring module may assign a rerouted call to this specially-defined call campaign and reroute the call directed to another agent or another component without involving the handle reroute module or an IVR 190 as described above.

Exemplary Processing Device Architecture

Figure 6:
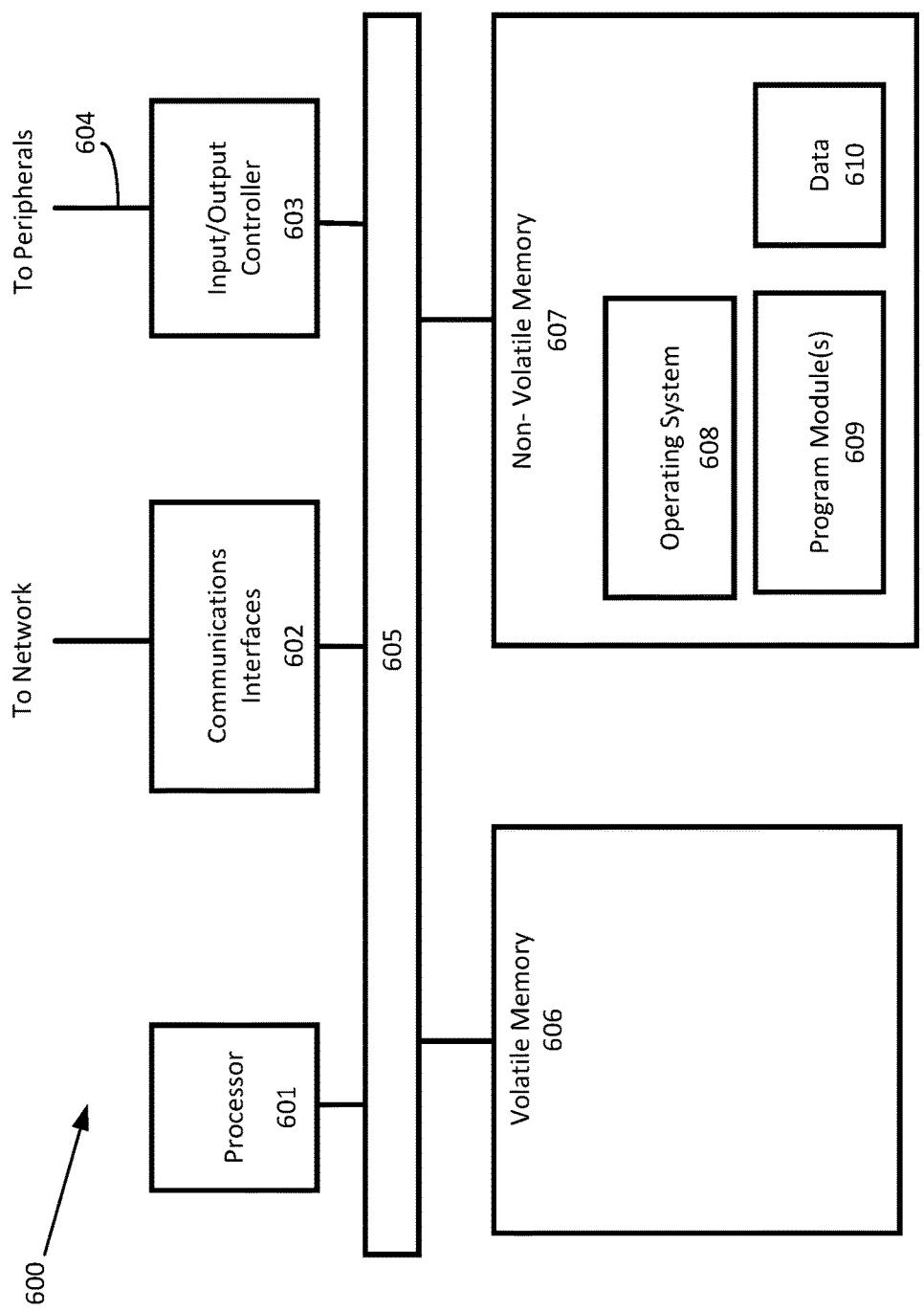
FIG. 6 is an exemplary schematic diagram of a server used in one embodiment of the contact center architecture to practice the technologies disclosed herein.

As discussed in conjunction with FIG. 1, the contact center architecture 100 may comprise various components that comprise a processing system. FIG. 6 is an exemplary schematic diagram of a processing component 600 that may be used in an embodiment of the contact center architecture 100 to practice the technologies disclosed herein such as, for example, the host server 110, web server 135, UTS 160, PBXs 165, 170, 175, IVR 190, or other components previously described. In general, the term "processing component" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 6, the processing component 600 may include one or more processors 601 that may communicate with other elements within the processing component 600 via a bus 605. The processor 601 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 600 may also include one or more communication interfaces 602 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 603 may also communicate with one or more input devices or peripherals using an interface 604, such as, but not limited to: a keyboard, a mouse, a touch screen/display input, microphone, pointing device, etc. The input/output controller 603 may also communicate with output devices or peripherals, such as displays, printers, speakers, headsets, banner displays, etc.

The processor 601 may be configured to execute instructions stored in volatile memory 606, non-volatile memory 607, or other forms of computer-readable storage media accessible to the processor 601. The volatile memory 606 may comprise various types of memory technologies, including, but not limited to: random access memory ("RAM"), dynamic random access memory ("DRAM"), static random access memory ("SRAM"), and other forms well known to those skilled in the art. The non-volatile memory 607 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 607 may store program code and data, which also may be loaded into the volatile memory 606 at execution time. Specifically, the non-volatile memory 607 may store one or more program modules 609, such as the monitoring module, check audio module, and/or handle reroute module described above containing instructions for performing the processes and/or functions associated with the technologies disclosed herein, and/or operating system code 608. In addition, these program modules 609 may also access, generate, or store data 610, in the non-volatile memory 607, as well as in the volatile memory 606. The volatile memory 606 and/or non-volatile memory 607 may be used to store other information including, but not limited to: records, applications, programs, scripts, source code, object code, byte code, compiled code, interpreted code, machine code, executable instructions, or the like. These may be executed or processed by, for example, the processor 601 and/or may form a part of, or may interact with, the program modules 609.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method comprising:
   establishing a first audio path connected to a first telephony device being used by a contact center agent;
   bridging a call onto the first audio path in which the call involves streaming audio from the first telephony device over the first audio path that is routed to a second telephony device being used by a remote party; and
   while the call is being conducted between the contact center agent and the remote party:
      identifying by a computer processor at least one of (1) not receiving a response within a time threshold to a request sent to a software application supporting a workstation being used by the contact center agent, (2) receiving a request from the workstation to log out the contact center agent, and (3) receiving a message signaling the first audio path is being torn down; and
      in response to identifying at least one of (1) not receiving the response to the request sent to the software application, (2) receiving the request from the workstation to log out the contact center agent, and (3) receiving the message signaling the first audio path is being torn down, bridging the call onto a second audio path connected to at least one of an interactive voice response system (IVR) and a third telephony device so that the call is not disconnected from the second telephony device and at least one of the IVR and the third telephony device can stream audio over the second audio path that is routed to the second telephony device.

2. The method of claim 1, wherein the first audio path is established over an IP network using session initiation protocol (SIP) and the message received by the computer processor signaling the first audio path is being torn down comprises a BYE SIP message.

3. The method of claim 1, wherein the first and second audio paths are established over a network using an integrated services digital network (ISDN) protocol and the message received by the computer processor signaling the first audio path is being torn down comprises an ISDN DISCONNECT message.

4. The method of claim 1 further comprising in response to identifying at least one of (1) not receiving the response to the request sent to the software application, (2) receiving the request from the workstation to log out the contact center agent, and (3) receiving the message signaling the first audio path is being torn down, playing a message over the first audio path that is routed to the second telephony device requesting the remote party to remain on the call.

5. The method of claim 1, wherein the audio streamed over the second audio path is from the IVR asking the remote party at least one of whether the remote party would like to receive a callback and whether the remote party would like to leave a voice mail.

6. A non-transitory, computer-readable medium comprising computer-executable instructions, that when executed while a call is being conducted between a contact center agent and a remote party, cause at least one computer processor to:
   identify at least one of (1) not receiving a response within a time threshold to a request sent to a software application supporting a workstation being used by the contact center agent, (2) receiving a request from the workstation to log out the contact center agent, and (3) receiving a message signaling a first audio path is being torn down, wherein the first audio path is used to stream audio during the call from a first telephony device being used by the contact center agent that is routed to a second telephony device being used by the remote party; and
   in response to identifying at least one of (1) not receiving the response to the request sent to the software application, (2) receiving the request from the workstation to log out the contact center agent, and (3) receiving the message signaling the first audio path is being torn down, have the call bridged onto a second audio path connected to at least one of an interactive voice response system (IVR) and a third telephony device so that the call is not disconnected from the second telephony device and at least one of the IVR and the third telephony device can stream audio over the second audio path that is routed to the second telephony device.

7. The non-transitory, computer-readable medium of claim 6, wherein the first audio path is established over an IP network using session initiation protocol (SIP) and the message signaling the first audio path is being torn down comprises a BYE SIP message.

8. The non-transitory, computer-readable medium of claim 6, wherein the first and second audio paths are established over a network using an integrated services digital network (ISDN) protocol and the message signaling the first audio path is being torn down comprises an ISDN DISCONNECT message.

9. The non-transitory, computer-readable medium of claim 6, wherein the computer-executable instructions are configured to cause the at least one computer processor to, in response to identifying at least one of (1) not receiving the response to the request sent to the software application, (2) receiving the request from the workstation to log out the contact center agent, and (3) receiving the message signaling the first audio path is being torn down, have a message played over the first audio path that is routed to the second telephony device requesting the remote party to remain on the call.

10. The non-transitory, computer-readable medium of claim 6, wherein the audio streamed over the second audio path is from the IVR asking the remote party at least one of whether the remote party would like to receive a callback and whether the remote party would like to leave a voice mail.

11. A system comprising:
   at least one computer processor configured, while a call is being conducted between a contact center agent and a remote party, to:
      identify at least one of (1) not receiving a response within a time threshold to a request sent to a software application supporting a workstation being used by the contact center agent, (2) receiving a request from the workstation to log out the contact center agent, and (3)) receiving a message signaling a first audio path is being torn down, wherein the first audio path is used to stream audio during the call from a first telephony device being used by the contact center agent that is routed to a second telephony device being used by the remote party; and in response to identifying at least one of (1) not receiving the response to the request sent to the software application, (2) receiving the request from the workstation to log out the contact center agent, and (3) receiving the message signaling the first audio path is being torn down, have the call bridged onto a second audio path connected to at least one of an interactive voice response system (IVR) and a third telephony device so that the call is not disconnected from the second telephony device and at least one of the IVR and the third telephony device can stream audio over the second audio path that is routed to the second telephony device.

12. The system of claim 11, wherein the first audio path is established over an IP network using session initiation protocol (SIP) and the message signaling the first audio path is being torn down comprises a BYE SIP message.

13. The system of claim 11, wherein the first and second audio paths are established over a network using an integrated services digital network (ISDN) protocol and the message signaling the first audio path is being torn down comprises an ISDN DISCONNECT message.

14. The system of claim 11, wherein the at least one computer processor is configured to, in response to identifying at least one of (1) not receiving the response to the request sent to the software application, (2) receiving the request from the workstation to log out the contact center agent, and (3) receiving the message signaling the first audio path is being torn down, have a message played over the first audio path that is routed to the second telephony device requesting the remote party to remain on the call.

15. The system of claim 11, wherein the audio streamed over the second audio path is from the IVR asking the remote party at least one of whether the remote party would like to receive a callback and whether the remote party would like to leave a voice mail.

* * * * *